United States Patent
Kanamarlapudi et al.

(10) Patent No.: US 11,792,680 B2
(45) Date of Patent: Oct. 17, 2023

(54) SYSTEMS AND METHODS FOR MANAGING TRANSMISSION CONTROL PROTOCOL (TCP) ACKNOWLEDGEMENT (ACK) TRANSMISSIONS

(71) Applicant: QUALCOMM Incorporated, San Diego, CA (US)

(72) Inventors: Sitaramanjaneyulu Kanamarlapudi, San Diego, CA (US); Alok Mitra, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/305,687

(22) Filed: Jul. 13, 2021

(65) Prior Publication Data

US 2022/0030461 A1    Jan. 27, 2022

Related U.S. Application Data

(60) Provisional application No. 63/057,225, filed on Jul. 27, 2020.

(51) Int. Cl.
*H04W 28/02* (2009.01)
*H04L 1/1607* (2023.01)
*H04L 47/10* (2022.01)

(52) U.S. Cl.
CPC ....... *H04W 28/0278* (2013.01); *H04L 1/1607* (2013.01); *H04L 47/39* (2013.01)

(58) Field of Classification Search
None
See application file for complete search history.

(56) References Cited

U.S. PATENT DOCUMENTS

2003/0117958 A1 * 6/2003 Nation .................... H04L 47/10
370/235

FOREIGN PATENT DOCUMENTS

| EP | 2341685 A1 | 7/2011 | |
|---|---|---|---|
| WO | 2008040725 A1 | 4/2008 | |
| WO | 2015156973 A1 | 10/2015 | |
| WO | WO-2015156973 A1 * | 10/2015 | ........... H04L 1/1835 |

OTHER PUBLICATIONS

International Search Report and Written Opinion—PCT/US2021/041707—ISA/EPO—Oct. 14, 2021.

* cited by examiner

*Primary Examiner* — Kouroush Mohebbi
(74) *Attorney, Agent, or Firm* — Haynes and Boone, LLP Qualcomm Incorporated

(57) ABSTRACT

Some aspects of the present disclosure disclose methods and systems for managing transmission control protocol (TCP) acknowledgements (ACK) transmissions from a host or application processor to a modem of a user equipment. The UE may detect availability of buffer space in a memory buffer of a modem of the UE. Further, the UE may also detect that a host processor of the UE lacks credit sufficient for transmitting data from the host processor to the modem. The UE may then generate and transmit to the host processor a data flow control (DFC) command including credit sufficient for the host processor to transmit at least a portion of the data to the modem. In some instances, in response to the transmission of the DFC command, the at least the portion of the data may be received at the modem from the host processor.

26 Claims, 7 Drawing Sheets

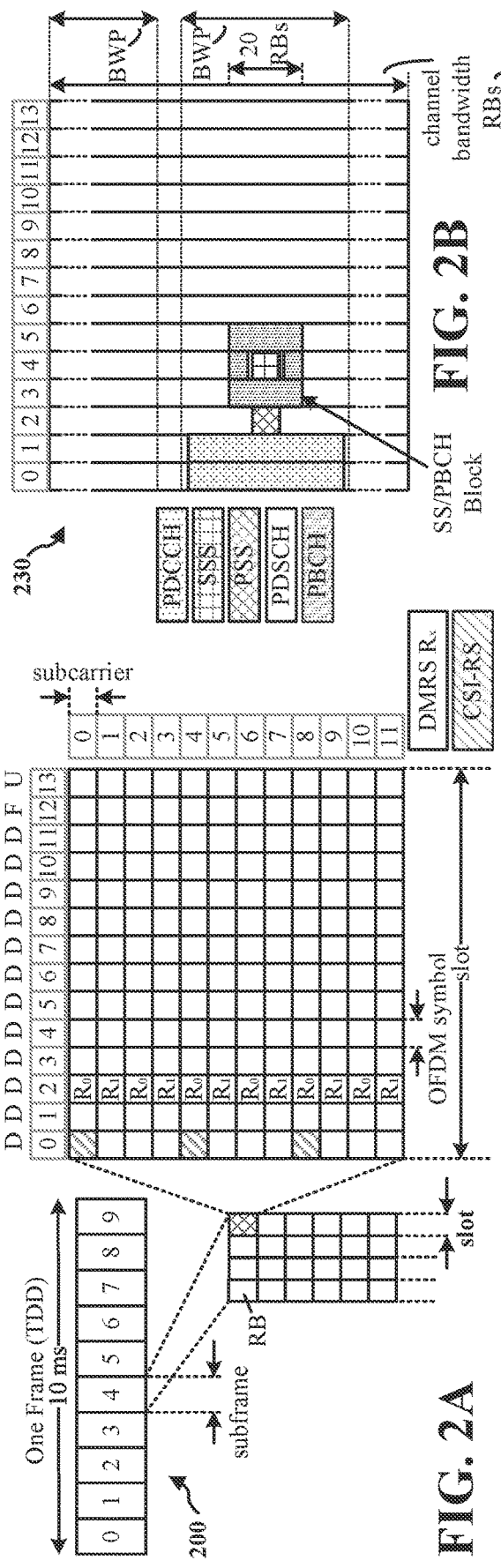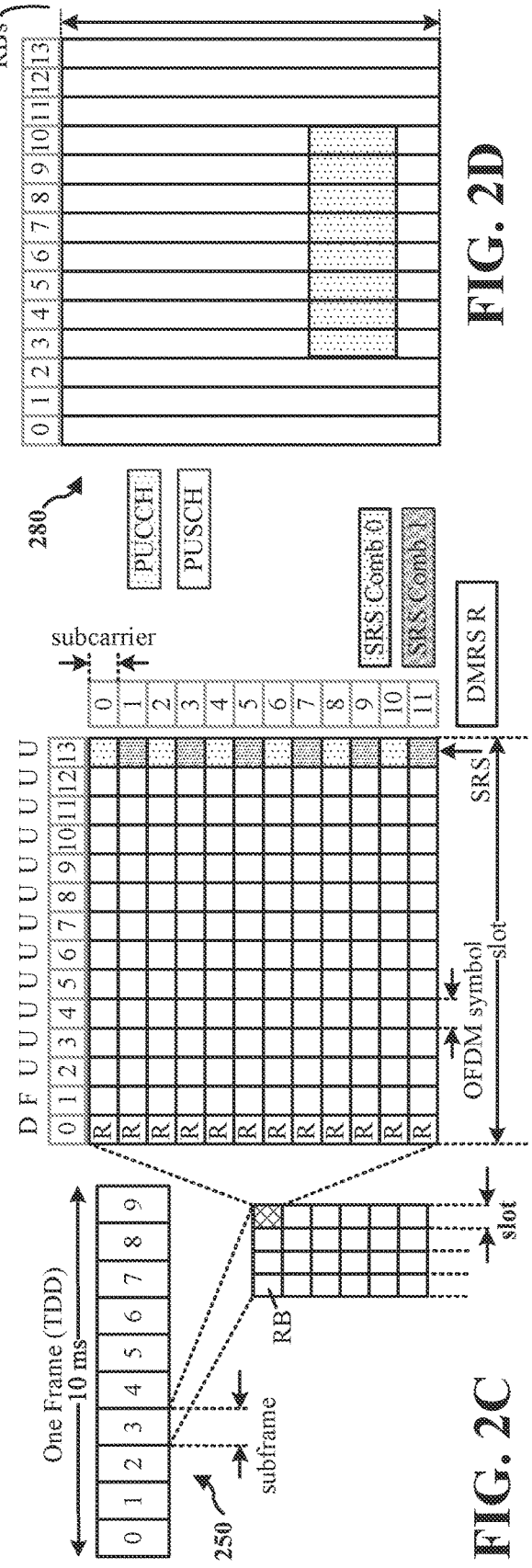

SYSTEMS AND METHODS FOR MANAGING TRANSMISSION CONTROL PROTOCOL (TCP) ACKNOWLEDGEMENT (ACK) TRANSMISSIONS

CROSS REFERENCE TO RELATED APPLICATIONS

The present application claims priority to and the benefit of the U.S. Provisional Patent Application No. 63/057,225, filed Jul. 27, 2020, titled "Systems and Methods for Managing Transmission Control Protocol (TCP) Acknowledgment (ACK) Transmissions," which is hereby incorporated by reference in its entirety as if fully set forth below and for all applicable purposes.

TECHNICAL FIELD

The present disclosure relates generally to communication systems, and more particularly, to systems and methods for managing transmission control protocol (TCP) acknowledgements (ACK) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some aspects of the present disclosure disclose a method of wireless communication performed by a user equipment (UE). The method comprises detecting availability of buffer space in a memory buffer of a modem of the UE. The method further comprises detecting that a host processor of the UE lacks credit sufficient for transmitting data from the host processor to the modem. The method further comprises generating a data flow control (DFC) command including credit sufficient for the host processor to transmit at least a portion of the data to the modem based on an amount of the buffer space. Further, the method comprises transmitting, from the modem to the host processor, the DFC command. In addition, the method comprises receiving, by the modem from the host processor, the at least the portion of the data in response to the transmitting the DFC command.

Some aspects of the present disclosure disclose a user equipment (UE) comprising a processor and a transceiver. The processor can be configured to detect availability of buffer space in a memory buffer of a modem of the UE. Further, the processor can be configured to detect that a host processor of the UE lacks credit sufficient for transmitting data from the host processor to the modem. Further, the processor can be configured to generate a data flow control (DFC) command including credit sufficient for the host processor to transmit at least a portion of the data to the modem based on an amount of the buffer space. In some aspects, the transceiver can be configured to transmit, from the modem to the host processor, the DFC command. Further, the transceiver can be configured to receive, by the modem from the host processor, the at least the portion of the data in response to the transmitting the DFC command.

Some aspects of the present disclosure disclose a iron-transitory computer-readable medium (CRM) having program code recorded thereon. In some aspects, the program code comprises code for causing a user equipment (UE) to detect availability of buffer space in a memory buffer of a modem of the UE. Further, the program code comprises code for causing the UE to detect that a host processor of the UE lacks credit sufficient for transmitting data from the host processor to the modem. Further, the program code comprises code for causing the UE to generate a data flow control (DFC) command including credit sufficient for the host processor to transmit at least a portion of the data to the modem based on an amount of the buffer space. Further, the program code comprises code for causing the UE to transmit, from the modem to the host processor, the DFC command. In addition, the program code comprises code for causing the UE to receive, by the modem from the host processor, the at least the portion of the data in response to the transmitting the DFC command.

Some aspects of the present disclosure disclose a user equipment (UE) comprising means for detecting availability of buffer space in a memory buffer of a modem of the UE. The UE further comprises means for detecting that a host processor of the UE lacks credit sufficient for transmitting data from the host processor to the modem. Further, the UE comprises means for generating a data flow control (DFC) command including credit sufficient for the host processor to transmit at least a portion of the data to the modem based on an amount of the buffer space. Further, the UE comprises means for transmitting, from the modem to the host processor, the DFC command. In addition, the UE comprises means for receiving, by the modem from the host processor, the at least the portion of the data in response to the transmitting the DFC command.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, according to some aspects of the present disclosure.

DETAILED DESCRIPTION

Figure 1:
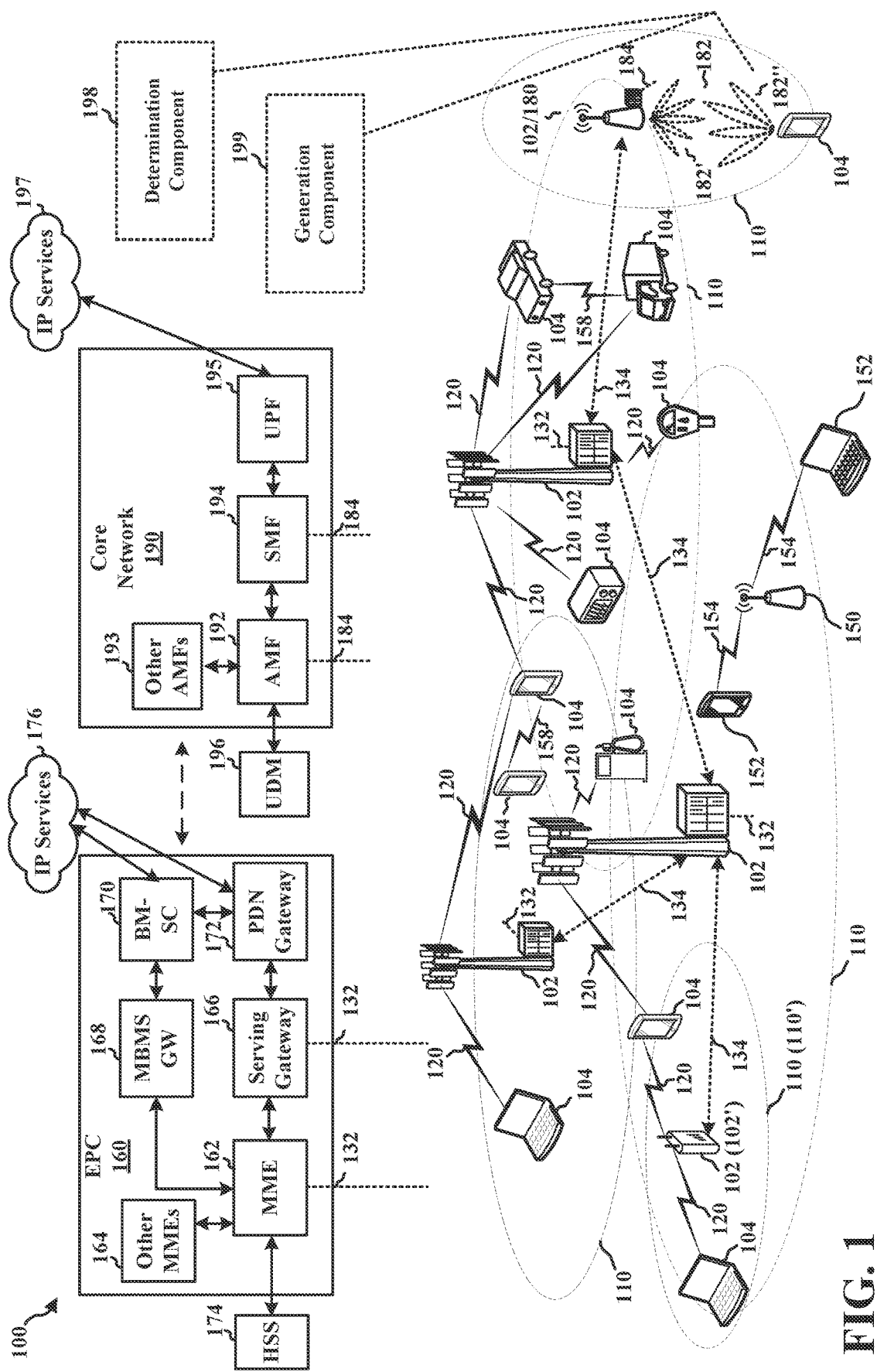
FIG. 1 is a diagram illustrating an example of a wireless communications system and an access network, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (CPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may determine an amount of first data in a memory of a modem of the UE 104. For example, the memory can be an application processor-accessible memory of the application layer of the UE 104. As another example, the memory can be a memory in the modem of the UE 104. In some aspects, the UE 104 may include a determination component 198 configured to determine the amount of first data in the memory of the modem of the UE 104. In some aspects, the UE 104 may determine that a host processor (e.g., an application processor of the application layer) of the UE 104 lacks credit sufficient for transmitting second data to the modem of the UE 104. For example, the determination component 198 may determine that the host processor lacks the sufficient credit. In some aspects, the UE 104 may generate a data flow control (DFC) command or message including the credit sufficient for transmitting the second data to the modem based on the determined amount of first data. For example, the UE 104 may include a generation component 199 configured to generate the DFC command including the sufficient credit. Further, the UE 104 may transmit the DFC command from the modem to the host processor. In addition, the UE 104 may receive, by the modem and from the host processor, the second data based on the DFC command. In some aspects, the terms "DFC command," "DFC message," "FC command," and "FC message" may be used alternatively throughout the present disclosure.

Although the present disclosure and accompanying drawings may be focused on 5G New Radio (NR), the concepts described herein may be applicable to other similar areas, such as LTE, LTE-Advanced (LTE-A), Code Division Multiple Access (CDMA), Global System for Mobile communications (GSM), and/or other wireless/radio access technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DWRS (indicated as R for one particular configuration, but other DM-RS configurations are possible) for channel estimation at the base station. The UE may transmit DM-RS for the physical uplink control channel (PDCCH) and DM-RS for the physical uplink shared channel (PUSCH). The PUSCH DM-RS may be transmitted in the first one or two symbols of the PUSCH. The PDCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
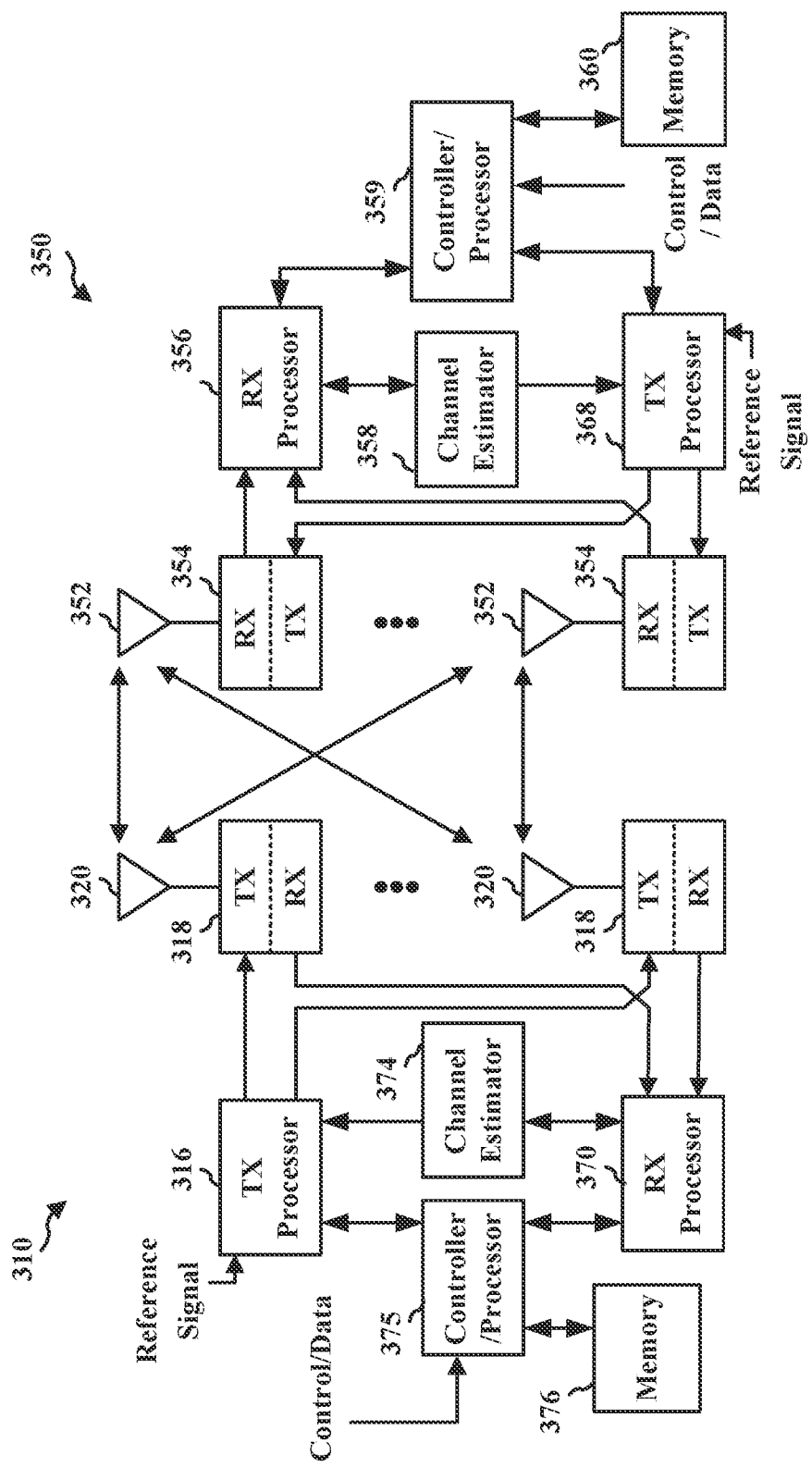
FIG. 3 is a diagram illustrating an example of a base station and user equipment (UE) in an access network, according to some aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

According to various aspects of the present disclosure, at least one of the TX processor 368, the RX processor 356, and/or the controller/processor 359 may be configured to perform aspects in connection with determination component 198 and generation component 199 of FIG. 1. For example, the controller/processor 359 of the UE 350 may determine an amount of first data in a memory (e.g., 360) of the UE. As another example, the controller/processor 359 of the UE 350 may determine that a host processor such as a processor of the application layer of UE 350 lacks credit sufficient for transmitting second data to a modem of the UE 350. As yet another example, the controller/processor 359 of the UE 350 may generate a data flow control (DFC) command including the credit sufficient for transmitting the second data to the modem based on the determined amount of the first data. The TX processor 368 of the UE 350 may transmit, from the modem to the host processor, the DFC command and the RX processor 356 may receive, by the modem from the host processor, the second data based on the DFC command.

Figure 4:
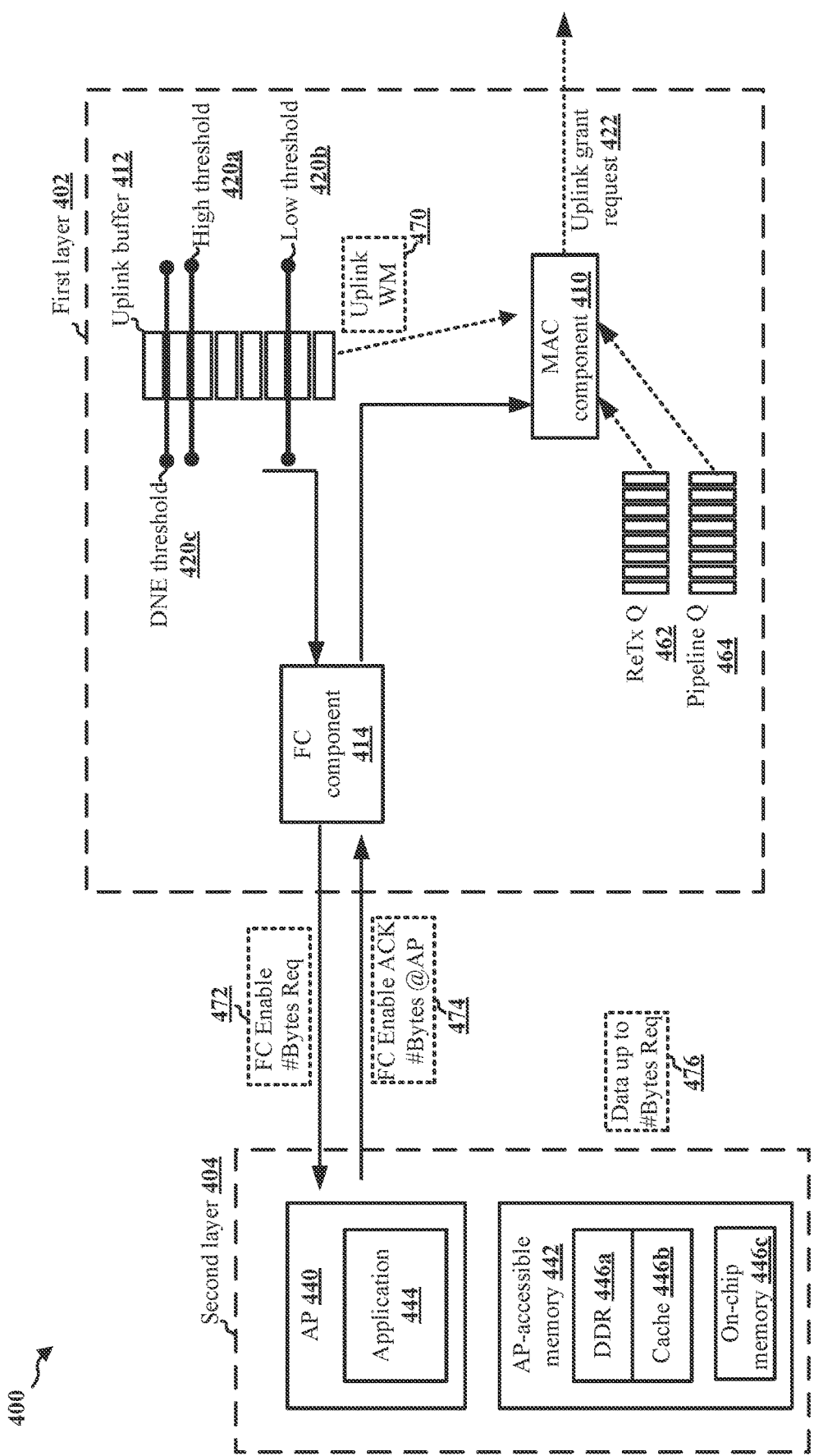
FIG. 4 is a block diagram illustrating an example architecture of a UE, according to some aspects of the present disclosure.

FIG. 4 illustrates an architecture of a UE 400. The architecture of the UE 400 may include multiple protocol stack layers, including a first layer 402 and a second layer 404. While the architecture of the UE 400 illustrates two layers, additional and/or different layers may be present in different aspects without departing from the scope of the present disclosure.

The first layer 402 may include L2 functionality, such as a PDCP layer, an RLC layer, and/or a MAC layer. For example, the first layer 402 may include a MAC component 410, which may implement various functionality of the MAC layer. In some aspects, the first layer 402 may include more than one layer, including Layer 3 (L3), L2, and/or Layer 1 (L1) (e.g., L1 may include a PHY layer). For example, the first layer 402 may represent one or more layers that are procedurally below the second layer 404 in the protocol stack of the architecture of the UE 400.

Illustratively, the first layer 402 may include a flow control (FC) component 414. The FC component 414 may be implemented in hardware, software, firmware, or a combination thereof. The FC component 414 may manage at least a portion of the data flow between the first layer 402 and the second layer 404. For example, the FC component 414 may control the flow of packets from the second layer 404 to the first layer 402.

The first layer 402 may further include a MAC component 410. The MAC component 410 may be implemented in hardware, software, firmware, or a combination thereof. The MAC component 410 may encapsulate data (e.g., packets) from an uplink buffer 412 in TBs sent during TTIs scheduled according to an uplink grant. In some aspects, the first layer 402 can be part of a modem of a UE.

The second layer 404 may include at least one layer that is procedurally implemented above the first layer 402. For example, the second layer 404 may include an application layer. Accordingly, the second layer 404 may include an application 444, the instructions of which may be executed by an application processor (AP) 440. In some aspects, the second layer 404 can be part of a host application of a UE.

Each of the first layer 402 and the second layer 404 may include memory in which to queue data for transmission over a wireless network. According to various aspects, the first layer 402 may include an uplink buffer 412, a retransmission queue 462, and an L2 pipeline queue 464. The uplink buffer 412 may include an L2 buffer and/or modem buffer that may queue data for encapsulation in MAC TBs and, therefore, the uplink buffer 412 may be configured to queue data received from a higher layer (e.g., the second layer 404) to be transmitted over the wireless network. The retransmission queue 462 may be configured to queue data that is to be retransmitted, such as packets that are dropped, corrupted, and/or negatively acknowledged (e.g., NACK'ed). The L2 pipeline queue 464 may be configured to queue data of lower layer(s) (e.g., the first layer 402) that is to be transmitted over the wireless network, such as uplink control information, HARQ ACK/NACK data, etc. The aggregate data in the uplink buffer 412, the retransmission queue 462, and the L2 pipeline queue 464 may be collectively referred to as L2 data.

At the second layer 404, the AP 440 may be communicatively coupled with an AP-accessible memory 442. The AP-accessible memory 442 may queue data (e.g., packets) that is to be transmitted over the wireless network, e.g., for the application 444. Data queued in the AP-accessible memory 442 may include application data 476 generated in association with execution of the application 444 by the AP 440.

The AP-accessible memory 442 may have a capacity that is greater than the uplink buffer 412. For example, the AP-accessible memory 442 may be configured to queue approximately two or three megabytes (MB) of data, whereas the uplink buffer 412 may be configured to queue approximately 512 kilobytes (kB) of data. However, other capacities are possible in other aspects.

In one aspect, the AP-accessible memory 442 may include double data rate (DDR) synchronous dynamic random-access memory (SDRAM) 446a. The DDR SDRAM 446a may be attached to a system cache 446b. The AP 440 may be configured to queue application data 476 in the system cache 446b, and defer queuing application data 476 in the DDR SDRAM 446a (e.g., until the system cache 446b is flushed).

In one aspect, the AP-accessible Memory 442 may additionally or alternatively include on-chip memory 446c. The AP 440 may be configured to queue application data 476 in the on-chip memory 446c. If the system cache 446b is limited (e.g., due to current operations, such as video/graphics processing by the UE 400), then the on-chip memory 446c may be used as an addition and/or alternative to the system cache 446b. For example, the on-chip memory 446c may provide overflow support when the system cache 446b is at or near capacity. That is, the AP 440 may queue application data 476 in the system cache 446b until the system cache 446b is at or near capacity, and then the AP 440 may switch to queuing application data 476 in the on-chip memory 446c (e.g., until the system cache 446b is flushed).

A size of data queued in memory may be referred to as a watermark (WM). Each WM may be expressed in a byte size (e.g., bytes, kB, and/or MB) and a respective VIM may correspond to a data size currently queued in one of the AP-accessible memory 442, the uplink buffer 412, the retransmission queue 462, or the L2 pipeline queue 464. For example, the data size in the uplink buffer 412 may be referred to as an uplink WM 470, and the uplink WM 470 may fluctuate as the uplink buffer 412 is drained and refilled.

When the uplink buffer 412 includes data, the uplink buffer 412 may be emptied. The MAC component 410 may determine the uplink WM 470 that indicates the data size currently queued in the uplink buffer 412. For example, the MAC component 410 may periodically poll the uplink buffer 412 to receive the uplink WM 470. IR another example, the FC component 414 may indicate to the MAC component 410 that the uplink WM 470 has reached at least one of the high threshold 420a or the DNE threshold 420c, and the MAC component 410 may determine the uplink WM 470 based on the indication from the FC component 414.

Based on the uplink WM 470, the MAC component 410 may send, to a base station, an uplink grant request 422 in order to obtain an uplink grant for sending the data queued in the uplink buffer 412. The uplink grant request 422 may include a BSR or buffer occupancy report. For example, the uplink grant request 422 may be based on the uplink WM 470.

In addition to the uplink WM 470, the MAC component 410 may generate an uplink grant request 422 based on data (e.g., packets) in the retransmission queue 462 and/or the L2 pipeline queue 464. Thus, the MAC component 410 may generate the uplink grant request 422 based on the sum of the uplink WM 470, a WM of the AP-accessible memory 442, a WM of the retransmission queue 462, and a WM of the L2 pipeline queue 464.

As the AP 440 executes the instructions of the application 444, application data 476 may be generated to be sent over a wireless network. In order to send the application data 476 over the wireless network, the AP 440 may provide the data to the first layer 402 so that the MAC component 410 may send the data over the wireless network according to a schedule provided by at least two uplink grants received from a base station. However, the size of the application data 476 generated by the AP 440 may exceed the high threshold 420a and/or the DNE threshold 420c of the uplink buffer 412. Therefore, the AP 440 may refrain from sending, to the first layer 402, application data 476 of a size that may otherwise cause the DNE threshold 420c to be exceeded. For example, the AP 440 may queue data to be sent over the wireless network by the MAC component 410.

Application data 476 queued in the AP-accessible memory 442 may still be sent over the wireless network, even though not yet queued in the uplink buffer 412. Thus, requesting an uplink grant that is based on the WM of the AP-accessible memory 442, in addition to the WMs of the uplink buffer 412, the retransmission queue 462, and the L2 pipeline queue 464, may be more efficient than various existing approaches, such as approaches in which an uplink grant is requested based on memory allocated to a MAC layer.

In some aspects, multiple thresholds may be configured in association with the uplink buffer 412. For example, the uplink buffer 412 may be configured with a high threshold 420a, a low threshold 420b, and/or a do not exceed (DNE) threshold 420c. One or more of these thresholds 420a-c may be configured by a 3GPP mode handler based on an RRC configuration that is indicated to the UE 400 (e.g., via RRC signaling) and/or may be dynamically configured (e.g., based on observing historical trends associated with draining and refilling the uplink buffer 412). The thresholds 420*a-c* may be compared with the uplink WM 470. In some aspects, the high threshold 420*a*, the low threshold 420*b*, and/or the do not exceed (DNE) threshold 420*c*, and the differences between the thresholds (i.e., the WM sizes) can be function of one or more parameters such as but not limited to an uplink configured throughput of the UE, a buffer status report (BSR) of a radio access technology (RAT) of the modem, a data transmission latency from a host to a modem (i.e., "interconnect latency"), a latency in flow control processes such as latency in generating and transmitting commands or hardware/memory requirements of the UE.

According to an aspect, the FC component 414 may monitor and manage one or more of the thresholds 420*a-c*. For example, when the DNE threshold 420*c* is reached (e.g., the uplink WM 470 is equal to or exceeds the DNE threshold 420*c*), the FC component 414 may signal the AP 440 to cease sending data to the uplink buffer 412. Therefore, the AP 440 may continue to queue data that is to be sent over the wireless network (e.g., data from the application 444) at AP-accessible memory 442 and/or the AP 440 may allocate other memory in which to queue the data while the uplink buffer 412 is emptied. When the DNE threshold 420*c* is reached, data sent from the AP 440 may be dropped because the uplink buffer 412 is at or near capacity.

In another example, when the low threshold 420*b* is reached (e.g., the uplink WM 470 is equal to or below the low threshold 420*b*), the FC component 414 may signal the AP 440 to resume sending data to the uplink buffer 412, e.g., from the AP-accessible memory 442.

In another example, when the high threshold 420*a* is reached (e.g., the uplink WM 470 is equal to or above the high threshold 420*a*), the FC component 414 may determine that no additional data should be queued in the uplink buffer 412. The FC component 414 may generate an FC message indicating that no more data should be sent to the first layer 402 to be queued in the uplink buffer 412. The FC component 414 may send such an FC message to the second layer 404 in order to instruct the AP 440 to refrain some sending additional data to the first layer 402. As mentioned above, the first layer 402 can be part of a modem of the UE.

In some aspects, the FC component 414 may signal the AP 440 about sending or refraining from sending data to the uplink buffer 412 with the use of credits that correspond to available data space in the uplink buffer 412. For example, an FC message from the FC component 414 to the AP 440 including a credit may be viewed as a permission from the FC component 414 to the AP 440 to send a unit of data (e.g., measured in unit of the WM such as but not limited to bytes, kB, and/or MB) to the first layer 402 (e.g., uplink buffer 412). As such, when the low threshold 420*b* is reached (e.g., the uplink WM 470 is equal to or below the low threshold 420*b*), the FC component 414 may send to the AP 440 a FC message including a given amount of credits, i.e., non-zero credits, to signal the AP 440 to send data to the first layer 402 in an amount equal to the given amount of credits to be queued in the uplink buffer 412. In another example, when the DNE threshold 420*c* is reached (e.g., the uplink WM 470 is equal to or exceeds the DNE threshold 420*c*) and/or the high threshold 420*a* is reached (e.g., the uplink WM 470 is equal to or above the high threshold 420*a*), the FC component 414 may send to the AP 440 a FC message including zero credit to signal the AP 440 to cease sending data to the first layer 402 (of the modem of the UE).

In some aspects, the FC message can be a periodic FC message that may not depend on the threshold levels of the uplink buffer 412. For example, a periodic FC can be a flow control message that may be sent periodically by the FC component 414 to the AP 440 when a periodic timer is reached, i.e., the periodic FC may be sent to the AP 440 with some periodicity (e.g., every about 2 milliseconds (ms), about 3 ms, about 4 ms, about 5 ms, about 6 ms, about 7 ms, about 8 ms, including values and subranges therebetween). In some aspects, the period of the FC message may not be fixed but may depend on the amount of data queued at the memory buffer of the modem. That is, in some aspects, the FC message can be a periodic FC message with a period that depends on the amount of data queued at the memory buffer of the modem (e.g., the uplink buffer 412 of the first layer 402 (e.g., which can be part of a modem of a UE)). For instance, the period and the amount of queued data may have an inverse relationship, i.e., the period may decrease (e.g., the FC message may be sent to the FC component 414 more frequently) as the amount of queued data increases or the period may increase (e.g., the FC message may be sent to the FC component 414 less frequently) as the amount of queued data decreases.

In various aspects, the low threshold 420*b* may be configured to be approximately equal to a data size needed to serve T milliseconds (ms) worth of uplink peak rate transmission. By way of illustration, T may be equal to four ms, each TTI may be equal to 200 microseconds (μs), and the peak MAC TB size per TTI may be equal to eight kB. Therefore, the low threshold 420*b* may be configured as 160 kB, which is equal to T ms divided by the TTI duration multiplied by the peak TB size or, equivalently in this example, (4 ms/200 μs)*8 kB. In some aspects, the low threshold 420*b* may be configured to be greater than the data size needed to serve T ms worth of uplink peak rate transmission e.g., the low threshold 420*b* may be configured as 200 kB.

The high threshold 420*a* may be configured to be greater than the low threshold 420*b*. For example, the high threshold 420*a* may be configured to be twice the low threshold, such as 400 kB. The DNE threshold 420*c* may be configured to be greater than the high threshold 420*a*. For example, the DNE threshold 420*c* may be configured to be 100 kB or 200 kB greater than the high threshold 420*a*. The thresholds 420*a-c* may be configured to have different values in other aspects.

In some aspects, as discussed above, the FC component 414 sends FC messages with non-zero credits to the AP 440 when the low threshold 420*b* is reached (e.g., the uplink WM 470 is equal to or below the low threshold 420*b*). Further, the FC component 414 provides no credit to the AP 440 when the DNE threshold 420*c* is reached (e.g., the uplink WM 470 is equal to or exceeds the DNE threshold 420*c*) and/or the high threshold 420*a* is reached (e.g., the uplink WM 470 is equal to or above the high threshold 420*a*). In some cases, for example during bi-directional data flow, the AP 440 may have TCP acknowledgements (ACKs) pending to be transmitted to the first layer 402 and the uplink buffer 412 of the first layer 402 may be filled with uplink data (e.g., uplink (UL) transmission control protocol (TCP) data). In some cases, the AP 440 may have already exhausted credits previously provided to it by the FC component 414 (e.g., to send the UL TCP data to the uplink buffer 412) and may not have any credit or sufficient credit to transmit the TCP ACKs to the FC component 414. Further, depending on the drain rate of the uplink buffer (i.e., the rate the data is being transferred out of the uplink buffer), it may take a long time for the UL TCP data to be drained such that the WM 470 is drained to or below the low threshold 420b. In other words, the TCP ACKs pending at the AP 440 may be delayed while FC component 414 awaits for the WM 470 level to reach the low threshold 420b so that the FC component 414 generates and sends to the AP 440 FC message with non-zero credits which the AP 440 can use to transmit the TCP ACKs to FC component 414.

In some aspects, the total delay experienced by the pending TCP ACKs to arrive at the first layer 402 can depend on the drain rate of the uplink buffer and/or the amount of UL TCP data. Further, the total delay can depend on any interconnect latency (i.e., latency associated with the transmission of an FC message configured to provide the AP 440 credit from FC component 414 to AP 440 as well as latency associated with the transmission of the TCP ACKs from the AP 440 to the first layer 402 or the uplink buffer 412). In addition, the total delay can depend on the time it may take FC component 414 to generate the FC message as well as the time it may take AP 440 to generate the TCP ACK data packets. In some cases, the total delay may be expressed as $T_{total\ delay} = T_{drain} + T_{latency}$, where $T_{drain}$=(buffer data−low threshold)/drain rate and $T_{latency}$ equals the sum of the time delay or latency associated with the transmission of the FC message, the time delay or latency associated with the transmission of the TCP ACKs from the AP 440 to the first layer 402 or the uplink buffer 412, the time it may take FC component 414 to generate the FC message and the time it may take AP 440 to generate the TCP ACK data packets.

In some aspects, the delay in transmitting TCP ACKs to the first layer 402 of the modem of a UE may affect user experience of the UE, as the delays may adversely affect system operations, i.e., the operations of the UE such as UL data transmission (for example, by increasing the latency of data transmissions between the UE and a base station/external server to which the UE is connected to). The delays may also adversely affect downlink (DL) data transmission. For example, DL scheduling of data being transmitted from a server at a network providing the DL data to the UE may be severely throttled without arrival of TCP ACKs at the server.

In some aspects, the delay in the transmission of TCP ACKs from the second layer 404 to the first layer 402 may cause variations in quality of service (QoS) as well as round trip time (RTT) between the host processor (e.g. AP 440) and the network. The delay and/or the RTT/QoS variations may be due to the UE 400 connecting to networks with multiple radio access technologies (RATS), using multiple frequency range (FR) bands for the connection to the networks, using different types of links (e.g., terrestrial and non-terrestrial links) in different bands for the connections, and/or the like. For instance, data from the UE 400 may be transmitted via networks with LTE RAT, NR RAT, and/or in dual connectivity mode (e.g., LTE and NR RATS), and the RTT of the data transmission and/or QoS related to the data transmission may be different based on the RAT used in the transmission of the data.

As another example, data transmission using FR1 (e.g., 15/30 KHz (i.e., 1 ms or 0.5 ms slots)) may have associated RTT and/or QoS that are different from the RTT and/or QoS associated with data transmitted using FR2 (e.g., 60/120 KHz (i.e., 0.25 ms or 0.125 ms slots)). Further, the RTT/QoS related to data transmission over a territorial link may be different from that related to data transmission over a non-territorial (e.g., satellite) link. For instance, a UE 400 in dual connectivity mode between a ground base station and a satellite base station may experience different data transmissions (e.g., and as such associated different RTT and/or QoS) based on whether the data transmission occurred over the ground base station (i.e., territorial link) versus the satellite base station (i.e., non-territorial link).

In some aspects, TCP ACK prioritizations may alleviate or eliminate scheduling variations that may be caused by the variations in RTT/QoS and/or delays in TCP ACK transmissions. As such, there is a need for methods and systems that facilitate improved transmissions of TCP ACKs from an application host to a modem, in particular when the WM level has not yet reached the low threshold of the WM.

Some aspects of the present disclosure disclose systems and methods for managing transmission control protocol (TCP) acknowledgements (ACK) transmissions where, among other things, an application processor of a UE with pending data (e.g., TCP ACKs) to transmit the pending data to a modem of the UE but not with sufficient credit to do the same may receive credits from the modem that allow the transmission of the pending data to the modem. For example, WM level of the modem may not have reached low threshold. For instance, the WM level of the modem level (e.g., the memory buffer level of the memory of the modem) may be above the low threshold level, i.e., the modem may not send a regular FC message with non-zero credit to the application processor. In such cases, to avoid the delay in transmitting data such as TCP ACKs from the application processor to the modem as discussed above, the modem may generate and send a FC message with non-zero credit to allow the transmission of the pending data such as the TCP ACKs to the modem. In some aspects, the FC message may be a periodic FC message with periodicity from about 2 ms to about 6 ms. In some aspects, the FC message may be a periodic FC message with periodicity depending on an amount of data queued at the memory buffer of the modem.

Figure 5:
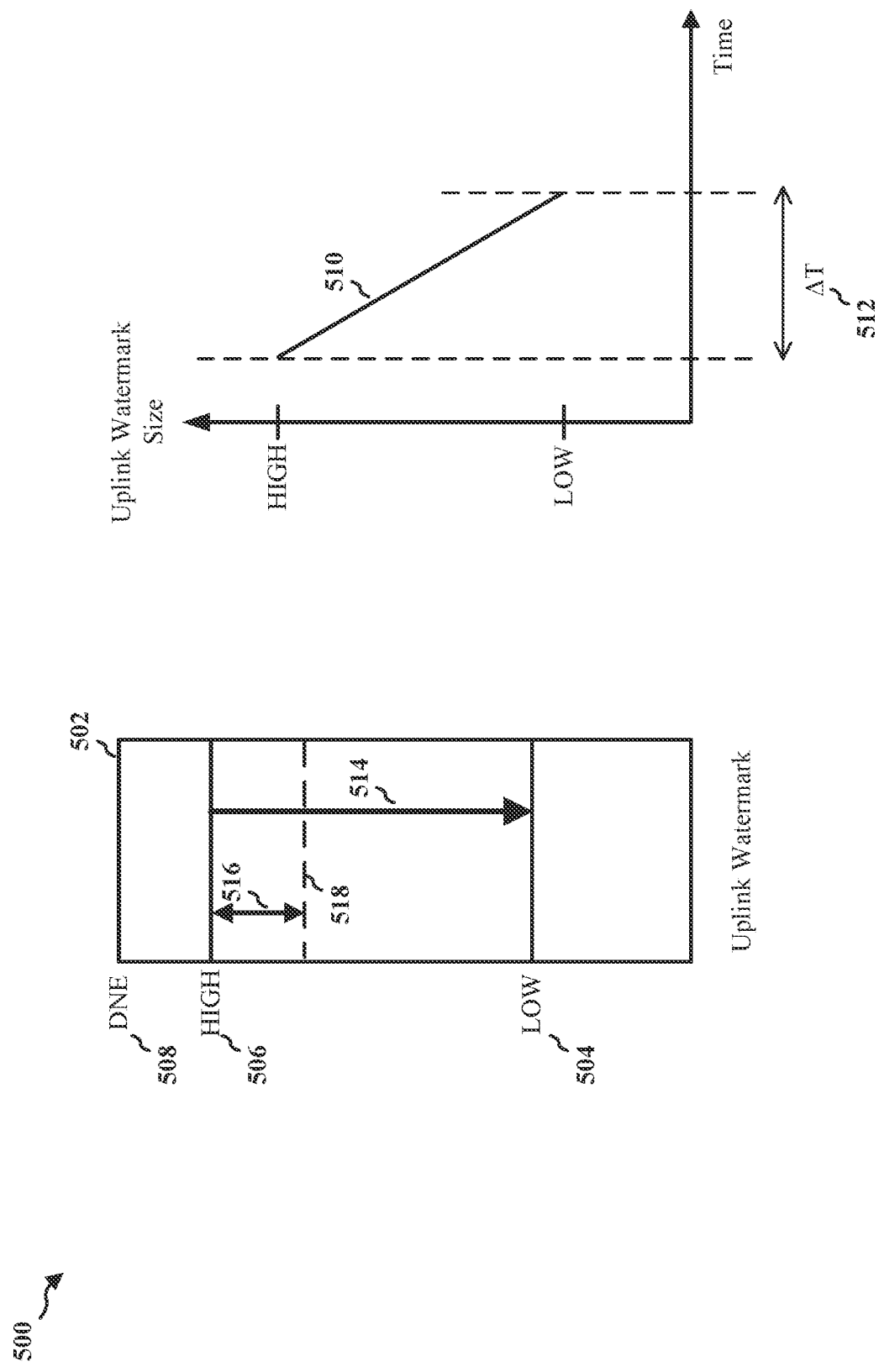
FIG. 5 is a diagram showing an example illustration of a drain rate of a memory buffer of a UE modem, according to some aspects of the present disclosure.

The above discussion may be illustrated with reference to FIG. 5 where an example drain rate of a memory buffer of a UE modem is shown, according to some aspects of the present disclosure. In some aspects, the uplink watermark 502 (e.g., similar to the uplink WM 470) may indicate the size of the data that is queued in the memory buffer (e.g., uplink buffer) of the modem of the UE (e.g., the modem may include or be associated with the PRY and/or MAC layer of the UE similar to the first layer 402 in FIG. 4). As discussed above with respect to uplink buffer 412, the uplink watermark 502 of the memory buffer of the UE modem may be associated with multiple thresholds, including a do not exceed (DNE) threshold 508, a high threshold 506, and a low threshold 504.

In some instances, when the amount or size of data queued at the memory buffer of the modem of the UE falls to or below the low threshold 504, the modem may transmit an FC message including non-zero credit to the host processor of the UE (e.g., similar to the AP 440 in FIG. 4) to allow the host processor to send out data (e.g., which may include TCP ACKs) to the modem (e.g., for transmission to the network to which the UE is connected). In some case, a credit may be associated with a given amount data that the host processor is allowed to transmit to the modem, and the host processor may send out the data at the host processor until the non-zero credit is used up, or the data is exhausted. In some cases, when the amount or size of data queued at the memory buffer of the modem of the UE reaches the high threshold 506 or above, the modem may transmit a FC message including zero credit to the host processor of the UE (e.g., similar to the AP 440 in FIG. 4) to instruct the host processor to cease sending out data to the modem (i.e., the FC message resets the amount of credit the host processor has to zero).

In some aspects, the host processor may not have any credit left, either because the host processor has used all its credit to send data out to the modem and/or the host processor has received a FC message with zero credit from the modem. In such cases, the host processor may have to wait until the modem transmits it a FC message with a non-zero credit to resume sending out data. Such data may include TCP ACKs configured to acknowledge reception, by the host processor, of prior data transmitted to the host processor via the modem (e.g., from a network to which the UE is connected). That is, in some cases or UEs, there may not be a continuous transmission of TCP ACKs from the host processor to the network (e.g., when the credit at the host processor is zero), which may result in the throttling of downlink scheduling/transmission from the network to the UE.

In some aspects, the time it may take the modem to send a FC message with non-zero credit so that the modem can resume sending data (e.g., including TCP ACKs) may depend on the drain rate of the memory buffer of the modem. That is, the time may depend on the rate the data queued at the memory buffer (e.g., uplink buffer) of the modem is sent out to the network such that the memory buffer level transitions 514 from high threshold 506 to low threshold 504 of the uplink watermark 502, for example. FIG. 5 shows an example drain rate 510 with corresponding drain time ΔT 512 for the memory buffer level of the uplink watermark 502 to transition 514 from high threshold 506 to low threshold 504. In such cases, the host processor may have to wait at least the drain time ΔT 512 (e.g., and in some cases longer than the drain time because of the time delay or latency discussed above with respect to FIG. 4) before it receives an FC message with a non-zero credit from the modem and resume sending out data (e.g., including TCP ACKs) to the modem for transmission to the network. It is to be understood that FIG. 5 is a non-limiting illustrative example and in some cases the drain rate may not be constant.

In some aspects, the delay may at least be reduced if the UE or the modem sends a FC message with a non-zero credit to the host processor even when the memory buffer level, i.e., the data queued at the memory buffer of the modem, has not reached or fallen below the low threshold 504. For example, as noted above, the host processor may have zero credit because it has received a FC message with zero credit from the modem (e.g., setting the credit the host processor possesses to zero) or it has used up all its credit. Further, consider the case where the memory buffer level is at high threshold 506 but is starting to fall because the data queued at the memory buffer of the modem is draining, i.e., is being sent out to the network by the modem. For instance, after a short period, the memory buffer level may have drained from the high threshold 506 to the intermediate buffer level 518. In such a case, the UE may detect that there is buffer space 516 (e.g., the memory buffer space between the high threshold 506 and the intermediate buffer level 518) available, and also that that the host processor does not have sufficient credit to transmit data from the host processor to the modem (e.g., the host processor may have zero credit). In such instances, the UE may generate a data FC with non-zero credit and transmit the same to the host processor (e.g., even though the memory buffer level, i.e., the intermediate buffer level 518 has not reached or fallen below the low threshold 504) so that the host processor can resume sending out data to the modem. For instance, the non-zero credit may be such that the data that the host processor is allowed to send out to the modem using the non-zero credit is at least substantially equal to or less than the size of the buffer space 516.

In other words, once the UE detects the host processor lacks sufficient credit to send data to the modem, and also once the UE detects buffer space is available at the memory buffer of the modem because the memory buffer level is draining from the high threshold 506, the UE (e.g., the modem) may generate a DEC with non-zero credit and transmit the same to the host processor, which allows the host processor to send oat data, such as TCP ACKs, in at least almost continuous manner (e.g., and as such reducing or eliminating DL throttling). In some instances, the UE or modem may generate and send the DFC with the non-zero credit to the host processor periodically (e.g., from about 2 ms to about 12 ms, about 3 ms to about 8 ms, about 4 ms to about 6 ms, etc., including values and subranges therebetween).

In some instances, the UE may detect that the host processor lacks sufficient credit to send data to the modem based on detecting or estimating that a round trip time (RTT) of TCP data between the host processor and a network to which the UE is connected is increasing. That is, if the RTT of data communication between the host processor and the network is increasing, that may be an indication to the UE that the host processor lacks sufficient credit (e.g., to at least substantially continuously transmit data from the host processor to the network via the modem).

In some aspects, the DFC command with non-zero credit may be generated when the drain rate is below a threshold drain rate. For example, if the drain rate is too low, i.e., equivalently the drain time (e.g., ΔT 512) is too high, the LTE may generate and transmit to the host processor the DFC command with the non-zero credit so that the host processor would not wait that long to resume transmission of data to the modem. If the drain rate is equal to or exceeds the threshold drain rate, the UE may nor generate or transmit to the host processor the DFC command with the non-zero credit.

In some aspects, upon receiving the DFC command with the non-zero credit from the modem, the host processor may prioritize the transmission of some types of data over other types. For example, if the data at the host processor includes TCP ACKs, the host processor may prioritize the transmission of the TCP ACKs before other data. In some instances, such a prioritization may occur when the non-zero credit included in the DEC command is below a threshold credit amount. For example, if the threshold credit can be the least amount of credit that may be needed to allow the transmission of the TCP ACKs from the host processor to the modem. In such case, the host processor may use the received credits to send out most or all of the TCP ACKs before using the rest, if any, of the received credits to transmit the other types of data to the modem.

In some instances, the data may include multiple types of data and the host processor may prioritize which data type to transmit to the modem based on the amount of credit included or indicated in the DFC command. For example, the data may include a first data type and a second data type, and the host processor may choose to transmit one of the data types to transmit to the modem before the other data types based on the amount of credit in the DFC command. For instance, the amount of credit may not be enough to transmit both data types, and the host processor may select one data type to transmit over the other to the modem. For instance, the data may include TCP ACKs, QUIC data, tuple data indicating specific application or end point, etc., and the host processor may determine the prioritization of these data types (e.g., the order by which the data types are transmitted from the host processor to the modem) based on the amount of the credit included in the DCF command. As another example, the amount of credit may be enough to transmit both data types, but the host processor may select the order of the transmission (e.g., which data types may be transmitted before the others) based on a priority ranking of data types.

Figure 6:
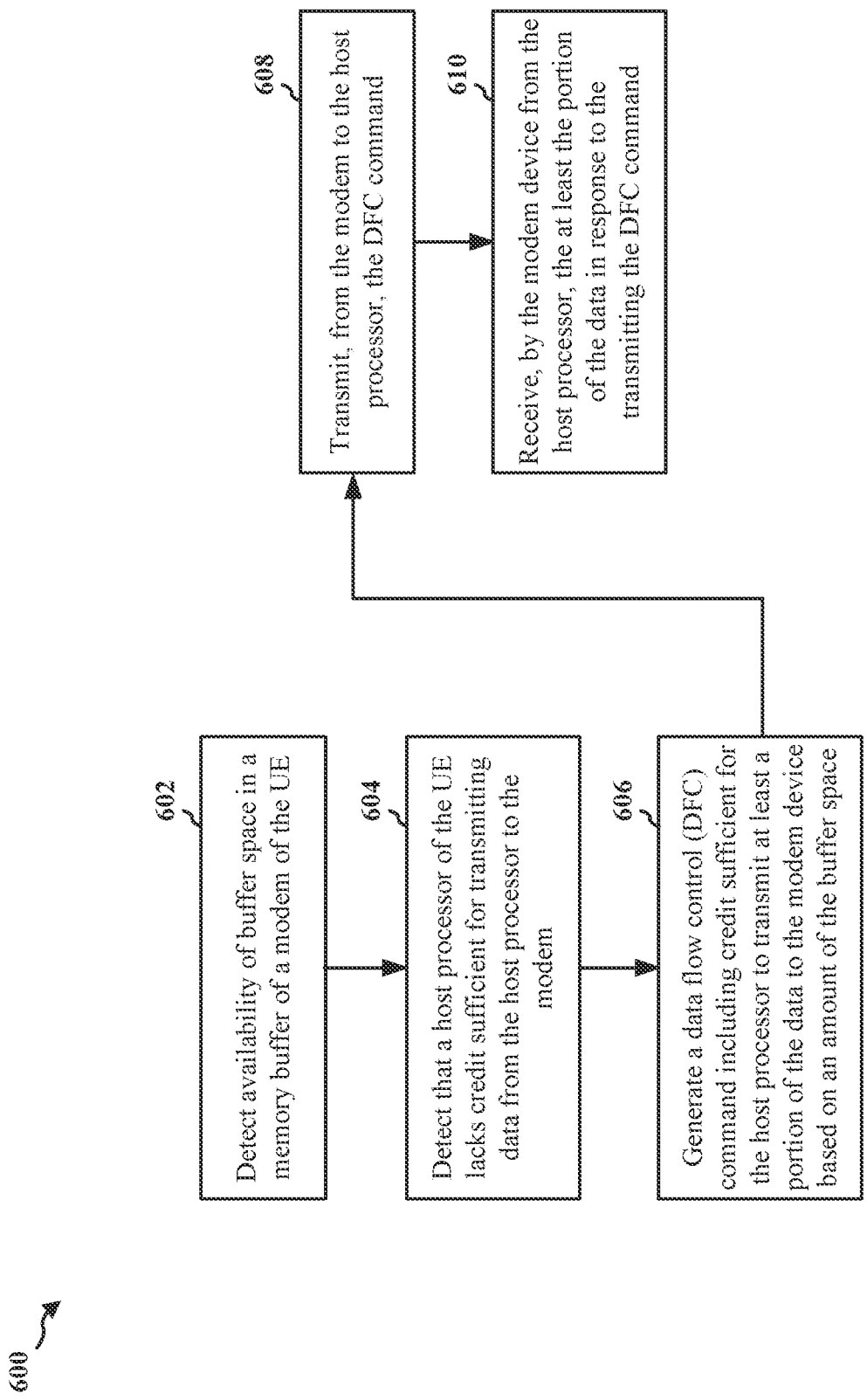
FIG. 6 is a flowchart of a method of wireless communication, according to some aspects of the present disclosure.

FIG. 6 is a flowchart illustrating a method 600 of wireless communication. The method may be performed by a UE or a component of a UE (e.g., the UE 104, 350, 400; the apparatus 702; the cellular baseband processor 704, which may include the memory 360 and which may be the entire UE 350 or a component of the UE 350, and/or the controller/processor 359). The UE and/or apparatus may include at least a first layer, such as a PHY and/or MAC layer, and a second layer, such as an application layer. The first layer can be part of a modem of the UE. One or more of the illustrated operations may be omitted, transposed, or contemporaneous. The method may enable data including TCP ACKs to be transmitted from the AP to a modem after the AP uses up most or all of its credit or its credit is reset to zero by the modem.

At 602, the UE may detect availability of buffer space in a memory buffer of a modem of the UE. In some aspects, the detecting the availability of the buffer space includes monitoring a drain rate of the memory buffer of the modem.

At 604, the UE may detect that a host processor of the UE lacks credit sufficient for transmitting data from the host processor to the modem. In some aspects, the data includes a transmission control protocol (TCP) acknowledgement (ACK) configured to acknowledge reception, by the host processor, of prior data transmitted to the host processor via the modem. In some aspects, the detecting that the host processor of the UE lacks credit sufficient for transmitting data from the host processor to the modem is based on a detection or an estimation that a round trip time (RTT) of TCP data between the host processor and a network to which the UE is connected is increasing.

In some aspects, the data includes a TCP ACK message, and the method further comprises prioritizing, at the host processor, transmission of the TCP ACK message from the host processor to the modem when the credit included in the DCF command is less than a threshold credit. In such cases, the threshold credit can be a least amount of credit required to allow transmission of the TCP ACK message from the host processor to the modem.

At 606, the UE may generate a data flow control (DFC) command including credit sufficient for the host processor to transmit at least a portion of the data to the modem based on an amount of the buffer space. In some aspects, the DFC is a periodic DFC with a period ranging from about 4 ms to about 6 ms. In some aspects, the DFC command is generated when the drain rate is below a threshold drain rate. In some aspects, the DFC message can be a periodic DFC message with a period that depends on the amount of data queued at the memory buffer of the modem.

At 608, the UE may transmit, from the modem to the host processor, the DFC command.

At 610, the UE may receive, by the modem from the host processor, the at least the portion of the data in response to the transmitting the DFC command.

Figure 7:
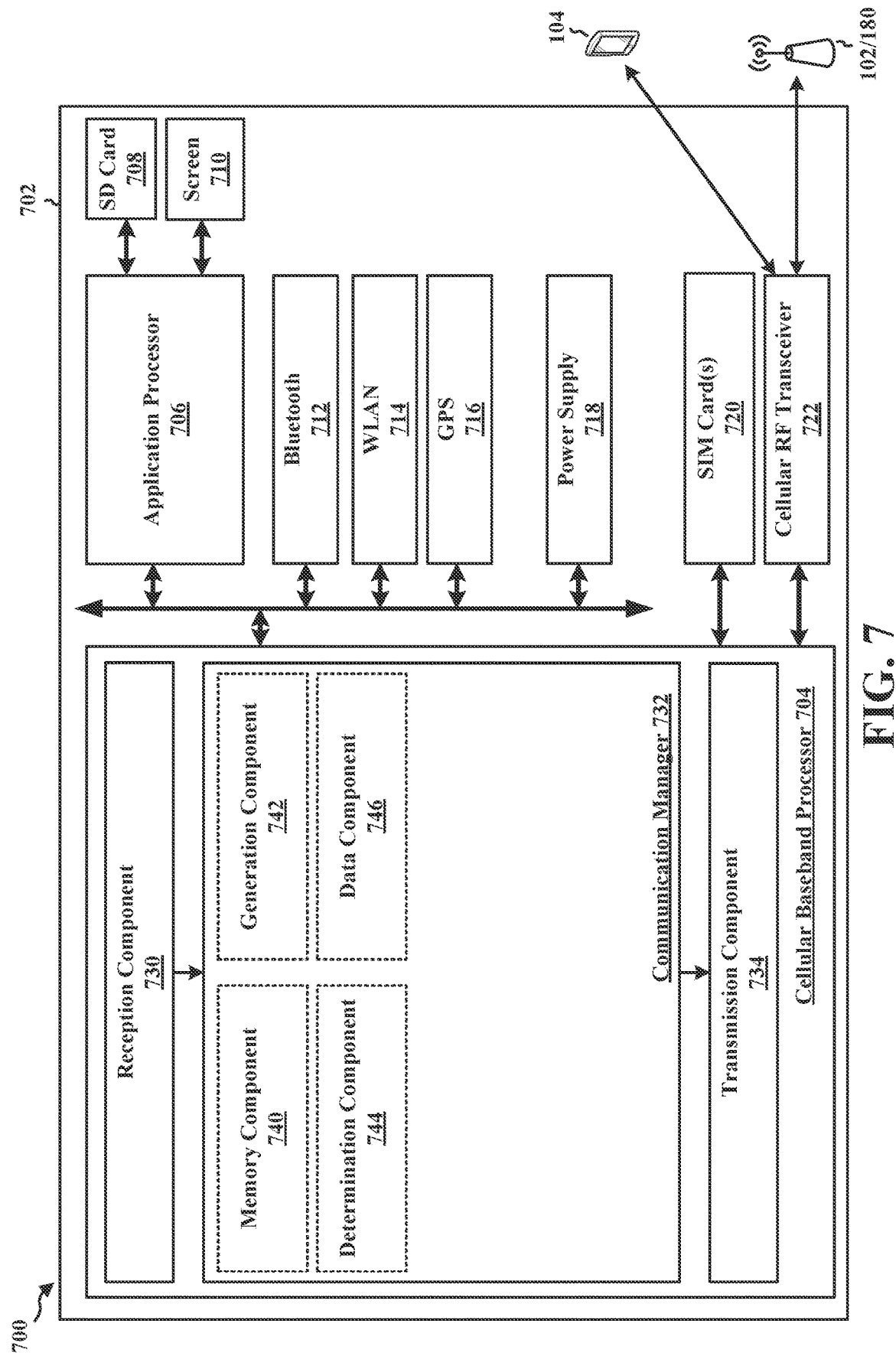
FIG. 7 is a diagram illustrating an example of a hardware implementation for an apparatus employing a processing system, according to some aspects of the present disclosure.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforementioned additional modules of the apparatus 702.

The communication manager 732 includes a memory component 740 that is configured to store the data transmissions (e.g., TCP ACKs) in a memory of the UE. The communication manager 732 further includes a generation component 742 that is configured to generate a data flow control (DFC) command including credit sufficient for the host processor to transmit at least a portion of the data to the modem based on an amount of the buffer space, e.g., as described in connection with 606 of FIG. 6. The communication manager 732 further includes a determination component 944 that is configured to (i) detect availability of buffer space in a memory buffer of a modem of the UE, e.g., as described in connection with 602 of FIG. 6, and (ii) detect that a host processor of the UE lacks credit sufficient for transmitting data from the host processor to the modem, e.g., as described in connection with 604 of FIG. 6. The reception component 730 is configured to receive, by the modem from the host processor, the at least the portion of the data in response to the transmitting the DEC command, e.g., as described in connection with 610 of FIG. 6. The transmission component 734 may be configured to transmit, from the modem to the host processor, the DFC command, e.g., as described in connection with 608 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Recitations of Some Aspects of the Present Disclosure

Aspect 1: A method of wireless communication performed by a user equipment (UE), the method comprising: detecting availability of buffer space in a memory buffer of a modem of the UE; detecting that a host processor of the UE lacks credit sufficient for transmitting data from the host processor to the modem; generating a data flow control (DFC) command including credit sufficient for the host processor to transmit at least a portion of the data to the modem based on an amount of the buffer space; transmitting, from the modem to the host processor, the DEC command; and receiving, by the modem from the host processor, the at least the portion of the data in response to the transmitting the DFC command.

Aspect 2: The method of aspect 1, wherein the data includes a transmission control protocol (TCP) acknowledgement (ACK) configured to acknowledge reception, by the host processor, of prior data transmitted to the host processor via the modem.

Aspect 3: The method of aspect 1 or 2, wherein the DFC is a periodic DFC with a period depending on an amount of data queued at the memory buffer of the modem.

Aspect 4: The method of any of aspects 1-3, wherein the data includes a TCP ACK message, the method further comprising: prioritizing, at the host processor, transmission of the TCP ACK message from the host processor to the modem when the credit included in the DCF command is less than a threshold credit.

Aspect 5: The method of aspect 4, wherein the threshold credit is a least amount of credit required to allow transmission of the TCP ACK message from the host processor to the modem.

Aspect 6: The method of any of aspects 1-5, wherein the detecting the availability of the buffer space includes monitoring a drain rate of the memory buffer of the modem.

Aspect 7: The method of aspect 6, wherein the DFC command is generated when the drain rate is below a threshold drain rate.

Aspect 8: The method of any of aspects 1-7, wherein the detecting that the host processor of the UE lacks credit sufficient for transmitting data from the host processor to the modem is based on a detection or an estimation that a round trip time (RTT) of TCP data between the host processor and a network to which the UE is connected is increasing.

Aspect 9: The method of any of aspects 1-8, wherein the data includes a first type of data and a second type of data, the method further comprising: prioritizing, at the host processor, transmission, from the host processor to the modem, of one of the first type of data or the second type of data over the other based on an amount of the credit included in the DCF command.

Aspect 10: A user equipment (UE), comprising: a memory; a processor coupled to the memory; and a transceiver coupled to the processor, the UE configured to perform the methods of aspects 1-9.

Aspect 11: A non-transitory computer-readable medium (CRM) having program code recorded thereon, the program code comprises code for causing a UE to perform the methods of aspects 1-9.

Aspect 12: A user equipment (UE) comprising means for performing the methods of aspects 1-9.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C." "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
   detecting availability of buffer space in a memory buffer of a modem of the UE;
   detecting that a host processor of the UE lacks credit sufficient for transmitting data from the host processor to the modem;
   periodically generating a data flow control (DFC) command when a periodic timer is reached, wherein the DFC command includes credit sufficient for the host processor to transmit at least a portion of the data to the modem based on an amount of the buffer space and a period of the periodic timer is variable based on an amount of the data queued at the memory buffer of the modem;
transmitting, from the modem to the host processor, the DFC command; and
receiving, by the modem from the host processor, the at least the portion of the data in response to the transmitting the DFC command.

2. The method of claim 1, wherein the data includes a transmission control protocol (TCP) acknowledgement (ACK) configured to acknowledge reception, by the host processor, of prior data transmitted to the host processor via the modem.

3. The method of claim 1, wherein the data includes a first type of data and a second type of data, the method further comprising:
prioritizing, at the host processor, transmission, from the host processor to the modem, of one of the first type of data or the second type of data over the other based on an amount of the credit included in the DFC command.

4. The method of claim 1, wherein the data includes a transmission control protocol (TCP) acknowledgement (ACK) message, the method further comprising:
prioritizing, at the host processor, transmission of the TCP ACK message from the host processor to the modem when the credit included in the DFC command is less than a threshold credit.

5. The method of claim 1, wherein the detecting the availability of the buffer space includes monitoring a drain rate of the memory buffer of the modem.

6. The method of claim 5, wherein the DFC command is generated when the drain rate is below a threshold drain rate.

7. The method of claim 1, wherein the detecting that the host processor of the UE lacks credit sufficient for transmitting data from the host processor to the modem is based on a detection or an estimation that a round trip time (RTT) of TCP data between the host processor and a network to which the UE is connected is increasing.

8. A user equipment (UE), comprising:
one or more processors configured to:
detect availability of buffer space in a memory buffer of a modem of the UE;
detect that a host processor of the UE lacks credit sufficient for transmitting data from the host processor to the modem; and
periodically generate a data flow control (DFC) command when a periodic timer is reached, the DFC command including credit sufficient for the host processor to transmit at least a portion of the data to the modem based on an amount of the buffer space, wherein a period of the periodic timer is variable based on an amount of the data queued at the memory buffer of the modem; and
a transceiver configured to:
transmit, from the modem to the host processor, the DFC command; and
receive, by the modem from the host processor, the at least the portion of the data in response to the transmitting the DFC command.

9. The UE of claim 8, wherein the data includes a transmission control protocol (TCP) acknowledgement (ACK) configured to acknowledge reception, by the host processor, of prior data transmitted to the host processor via the modem.

10. The UE of claim 8, wherein the data includes a first type of data and a second type of data, the one or more processors further configured to:
prioritize, at the host processor, transmission, from the host processor to the modem, of one of the first type of data or the second type of data over the other based on an amount of the credit included in the DFC command.

11. The UE of claim 8, wherein the data includes a transmission control protocol (TCP) acknowledgement (ACK) message, the one or more processors further configured to:
prioritize, at the host processor, transmission of the TCP ACK message from the host processor to the modem when the credit included in the DFC command is less than a threshold credit.

12. The UE of claim 8, wherein the one or more processors are further configured to monitor a drain rate of the memory buffer of the modem to detect the availability of the buffer space.

13. The UE of claim 12, wherein the DFC command is generated when the drain rate is below a threshold drain rate.

14. The UE of claim 8, wherein the one or more processors are configured to detect that the host processor of the UE lacks credit sufficient for transmitting data from the host processor to the modem is based on a detection or an estimation that a round trip time (RTT) of TCP data between the host processor and a network to which the UE is connected is increasing.

15. A non-transitory computer-readable medium (CRM) having program code recorded thereon, the program code comprising:
code for causing a user equipment (UE) to detect availability of buffer space in a memory buffer of a modem of the UE;
code for causing the UE to detect that a host processor of the UE lacks credit sufficient for transmitting data from the host processor to the modem;
code for causing the UE to periodically generate a data flow control (DFC) command when a periodic timer is reached, the DFC command including credit sufficient for the host processor to transmit at least a portion of the data to the modem based on an amount of the buffer space, wherein a period of the periodic timer is variable based on an amount of the data queued at the memory buffer of the modem;
code for causing the UE to transmit, from the modem to the host processor, the DFC command; and
code for causing the UE to receive, by the modem from the host processor, the at least the portion of the data in response to the transmitting the DFC command.

16. The non-transitory CRM of claim 15, wherein the data includes a transmission control protocol (TCP) acknowledgement (ACK) configured to acknowledge reception, by the host processor, of prior data transmitted to the host processor via the modem.

17. The non-transitory CRM of claim 15, wherein the data includes a first type of data and a second type of data, the program code further comprising:
code for causing the UE to prioritize, at the host processor, transmission, from the host processor to the modem, of one of the first type of data or the second type of data over the other based on an amount of the credit included in the DFC command.

18. The non-transitory CRM of claim 15, wherein the data includes a transmission control protocol (TCP) acknowledgement (ACK) message, the program code further comprising:
code for causing the UE to prioritize, at the host processor, transmission of the TCP ACK message from the host processor to the modem when the credit included in the DFC command is less than a threshold credit.

19. The non-transitory CRM of claim 15, wherein the program code further comprises code for causing the UE to monitor a drain rate of the memory buffer of the modem to detect the availability of the buffer space.

20. The non-transitory CRM of claim 15, wherein the detecting that the host processor of the UE lacks credit sufficient for transmitting data from the host processor to the modem is based on a detection or an estimation that a round trip time (RTT) of TCP data between the host processor and a network to which the UE is connected is increasing.

21. A user equipment (UE), comprising:
 means for detecting availability of buffer space in a memory buffer of a modem of the UE;
 means for detecting that a host processor of the UE lacks credit sufficient for transmitting data from the host processor to the modem;
 means for periodically generating a data flow control (DFC) command when a periodic timer is reached, the DFC command including credit sufficient for the host processor to transmit at least a portion of the data to the modem based on an amount of the buffer space, wherein a period of the periodic timer is variable based on an amount of the data queued at the memory buffer of the modem;
 means for transmitting, from the modem to the host processor, the DFC command; and
 means for receiving, by the modem from the host processor, the at least the portion of the data in response to the transmitting the DFC command.

22. The UE of claim 21, wherein the data includes a transmission control protocol (TCP) acknowledgement (ACK) configured to acknowledge reception, by the host processor, of prior data transmitted to the host processor via the modem.

23. The UE of claim 21, wherein the data includes a transmission control protocol (TCP) acknowledgement (ACK) message, the UE further comprising:
 means for prioritizing, at the host processor, transmission of the TCP ACK message from the host processor to the modem when the credit included in the DFC command is less than a threshold credit.

24. The UE of claim 21, wherein the UE further comprises means for monitoring a drain rate of the memory buffer of the modem to detect the availability of the buffer space.

25. The UE of claim 24, wherein the DFC command is generated when the drain rate is below a threshold drain rate.

26. The UE of claim 21, wherein the detecting that the host processor of the UE lacks credit sufficient for transmitting data from the host processor to the modem is based on a detection or an estimation that a round trip time (RTT) of TCP data between the host processor and a network to which the UE is connected is increasing.

* * * * *